US012015211B2

(12) United States Patent
Lo et al.

(10) Patent No.: US 12,015,211 B2
(45) Date of Patent: Jun. 18, 2024

(54) ANTENNA SYSTEM

(71) Applicant: Quanta Computer Inc., Taoyuan (TW)

(72) Inventors: Wen Yuan Lo, Taoyuan (TW); Hui Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 59 days.

(21) Appl. No.: 18/051,025

(22) Filed: Oct. 31, 2022

(65) Prior Publication Data

US 2024/0097330 A1 Mar. 21, 2024

(30) Foreign Application Priority Data

Sep. 20, 2022 (TW) ................................ 111210216

(51) Int. Cl.
*H01Q 5/385* (2015.01)
*H01Q 5/307* (2015.01)
*H01Q 9/42* (2006.01)
*H01Q 21/28* (2006.01)

(52) U.S. Cl.
CPC ............ *H01Q 5/307* (2015.01); *H01Q 5/385* (2015.01); *H01Q 9/42* (2013.01); *H01Q 21/28* (2013.01)

(58) Field of Classification Search
CPC ........... H01Q 5/385; H01Q 9/42; H01Q 21/28
See application file for complete search history.

(56) References Cited

U.S. PATENT DOCUMENTS

2010/0123639 A1* 5/2010 Tai ......................... H01Q 21/29 343/893
2020/0106178 A1* 4/2020 Chou ................... H01Q 1/2291
2021/0328346 A1* 10/2021 Zhang ....................... H01Q 7/00
2022/0094060 A1* 3/2022 Chang .................... H01Q 5/385
2023/0099558 A1* 3/2023 Jung ........................ H01Q 9/40 343/713
2024/0039157 A1* 2/2024 Chang .................... H01Q 1/243

FOREIGN PATENT DOCUMENTS

CN 114094325 A * 2/2022

* cited by examiner

*Primary Examiner* — Dameon E Levi
*Assistant Examiner* — Leah Rosenberg
(74) *Attorney, Agent, or Firm* — McClure, Qualey & Rodack, LLP

(57) ABSTRACT

An antenna system includes a first antenna element and a second antenna element. The first antenna element includes a first ground element, a first radiation element, a second radiation element, and a third radiation element. The first radiation element has a first feeding point. The second radiation element is coupled to the first ground element. The third radiation element is coupled to the first ground element. The third radiation element is adjacent to the first radiation element and the second radiation element. The second antenna element includes a second ground element, a fourth radiation element, a fifth radiation element, and a sixth radiation element. The fourth radiation element has a second feeding point. The fifth radiation element is adjacent to the fourth radiation element. The fifth radiation element is coupled through the sixth radiation element to the second ground element.

10 Claims, 5 Drawing Sheets

100

ANTENNA SYSTEM

CROSS REFERENCE TO RELATED APPLICATIONS

This application claims priority of Taiwan Patent Application No. 111210216 filed on Sep. 20, 2022, the entirety of which is incorporated by reference herein.

BACKGROUND OF THE INVENTION

Field of the Invention

The disclosure relates in general to an antenna system, and in particular, to an antenna system with high isolation.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

An antenna is a common component in a mobile device supporting wireless communication. However, since the interior space of a mobile device is very limited, multiple antennas and their transmission lines are usually disposed close to each other. This spacing can cause serious interference between them. As a result, there is a need to propose a novel solution for solving the problem of poor isolation in the conventional design.

BRIEF SUMMARY OF THE INVENTION

In an exemplary embodiment, the invention is directed to an antenna system that includes a first antenna element and a second antenna element. The first antenna element includes a first ground element, a first radiation element, a second radiation element, and a third radiation element. The first radiation element has a first feeding point. The second radiation element is coupled to the first ground element. The third radiation element is coupled to the first ground element. The third radiation element is adjacent to the first radiation element and the second radiation element. The second antenna element includes a second ground element, a fourth radiation element, a fifth radiation element, and a sixth radiation element. The fourth radiation element has a second feeding point. The fifth radiation element is adjacent to the fourth radiation element. The fifth radiation element is coupled through the sixth radiation element to the second ground element.

In some embodiments, the first distance between the first antenna element and the second antenna element is longer than or equal to 43 mm.

In some embodiments, the second distance between the first feeding point and the second feeding point is longer than or equal to 65 mm.

In some embodiments, the first radiation element substantially has a straight-line shape, the second radiation element substantially has an L-shape, and the third radiation element substantially has an inverted L-shape.

In some embodiments, the fourth radiation element substantially has a straight-line shape, the fifth radiation element substantially has an N-shape, and the sixth radiation element substantially has a rectangular shape.

In some embodiments, a first coupling gap is formed between the third radiation element and the first radiation element. A second coupling gap is formed between the third radiation element and the second radiation element. A third coupling gap is formed between the fifth radiation element and the fourth radiation element. The width of each of the first coupling gap, the second coupling gap, and the third coupling gap is shorter than or equal to 2 mm.

In some embodiments, the antenna system covers a first frequency band and a second frequency band. The first frequency band is from 2400 MHz to 2500 MHz. The second frequency band is from 5150 MHz to 5850 MHz.

In some embodiments, the total length of the second radiation element and the third radiation element is substantially equal to 0.25 wavelength of the first frequency band.

In some embodiments, the length of the third radiation element is substantially equal to 0.25 wavelength of the second frequency band.

In some embodiments, the length of the fifth radiation element is substantially equal to 0.25 wavelength of the second frequency band.

In some embodiments, the total length of the fifth radiation element and the sixth radiation element is substantially equal to 0.25 wavelength of the first frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
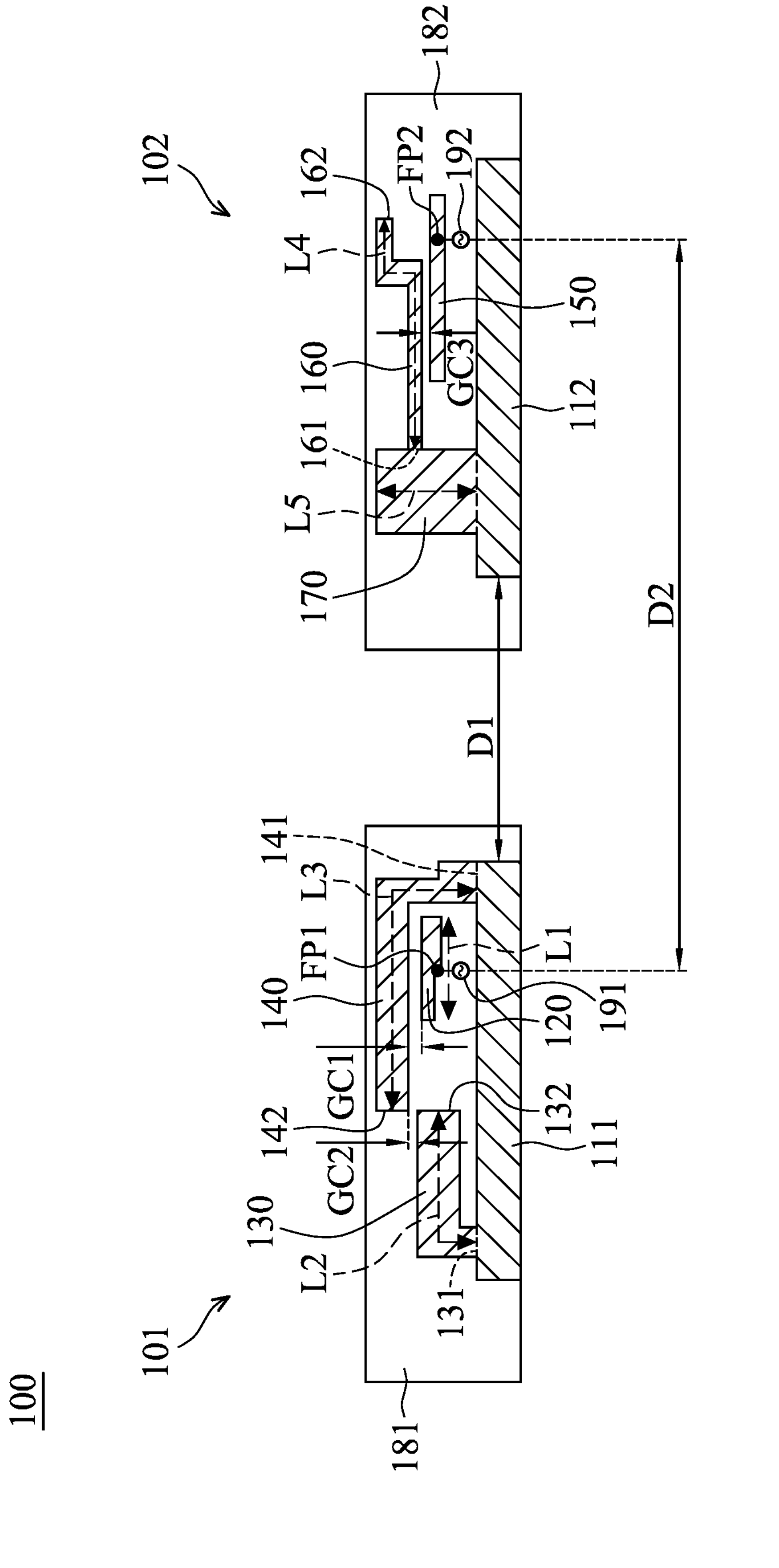
FIG. 1 is a diagram of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range.

One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna system 100 according to an embodiment of the invention. The antenna system 100 may be applied to a mobile device, such as a handheld game machine, a smart phone, a tablet computer, a notebook computer, a wireless access point, a router, or any device with a communication function. Alternatively, the antenna system 100 may be applied to an electronic device, such as any unit of IOT (Internet of Things).

In the embodiment of FIG. 1, the antenna system 100 at least includes a first antenna element 101 and a second antenna element 102. For example, the first antenna element 101 may be considered as a main antenna element, and the second antenna element 102 may be considered as an auxiliary antenna element, but they are not limited thereto.

The first antenna element 101 includes a first ground element 111, a first radiation element 120, a second radiation element 130, and a third radiation element 140. The first ground element 111, the first radiation element 120, the second radiation element 130, and the third radiation element 140 may all be made of metal materials, such as copper, silver, aluminum, iron, or their alloys. The first ground element 111 may be implemented with a ground copper foil, which may be coupled to a system ground plane (not shown) of the antenna system 100.

The first radiation element 120 may substantially have a relatively short straight-line shape. Specifically, the first radiation element 120 has a first feeding point FP1. The first feeding point FP1 may be further coupled to a first signal source 191. For example, the first signal source 191 may be an RF (Radio Frequency) module for exciting the first antenna element 101. It should be noted that the first radiation element 120 is completely separate from the first ground element 111, the second radiation element 130, and the third radiation element 140.

The second radiation element 130 may substantially have an L-shape. Specifically, the second radiation element 130 has a first end 131 and a second end 132. The first end 131 of the second radiation element 130 is coupled to the first ground element 111. The second end 132 of the second radiation element 130 is an open end.

The third radiation element 140 may substantially have an inverted L-shape. Specifically, the third radiation element 140 has a first end 141 and a second end 142. The first end 141 of the third radiation element 140 is coupled to the first ground element 111. The second end 142 of the third radiation element 140 is an open end. For example, the second end 142 of the third radiation element 140 and the second end 132 of the second radiation element 130 may substantially extend toward each other. The third radiation element 140 are adjacent to both of the first radiation element 120 and the second radiation element 130. A first coupling gap GC1 may be formed between the third radiation element 140 and the first radiation element 120. A second coupling gap GC2 may be formed between the third radiation element 140 and the second radiation element 130. The width of the first coupling gap GC1 may be greater than the width of the second coupling gap GC2. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

In some embodiments, the first antenna element 101 further includes a first dielectric substrate 181. The first ground element 111, the first radiation element 120, the second radiation element 130, and the third radiation element 140 may be disposed on the same surface of the first dielectric substrate 181. For example, the first dielectric substrate 181 may be an FR4 (Flame Retardant 4) substrate, a PCB (Printed Circuit Board), or an FPC (Flexible Printed Circuit).

The second antenna element 102 includes a second ground element 112, a fourth radiation element 150, a fifth radiation element 160, and a sixth radiation element 170. The second ground element 112, the fourth radiation element 150, the fifth radiation element 160, and the sixth radiation element 170 may all be made of metal materials, such as copper, silver, aluminum, iron, or their alloys. The second ground element 112 may be implemented with another ground copper foil, which may also be coupled to the system ground plane of the antenna system 100.

The fourth radiation element 150 may substantially have a relatively long straight-line shape (in comparison to the first radiation element 120). Specifically, the fourth radiation element 150 has a second feeding point FP2. The second feeding point FP2 may be further coupled to a second signal source 192. For example, the second signal source 192 may be another RF module for exciting the second antenna element 102. It should be noted that the fourth radiation element 150 is completely separate from the second ground element 112, the fifth radiation element 160, and the sixth radiation element 170.

The fifth radiation element 160 may substantially has an N-shape. Specifically, the fifth radiation element 160 has a first end 161 and a second end 162. The first end 161 of the fifth radiation element 160 is coupled to the sixth radiation element 170. The second end 162 of the fifth radiation element 160 is an open end. For example, the second end 162 of the fifth radiation element 160 and the second end 132 of the second radiation element 130 may substantially extend in the same direction. The fifth radiation element 160 is adjacent to the fourth radiation element 150. A third coupling gap GC3 is formed between the fifth radiation element 160 and the fourth radiation element 150.

The sixth radiation element 170 may substantially have a rectangular shape. The fifth radiation element 160 is coupled through the sixth radiation element 170 to the second ground element 112.

In some embodiments, the second antenna element 102 further includes a second dielectric substrate 182. The second ground element 112, the fourth radiation element 150, the fifth radiation element 160, and the sixth radiation element 170 may be disposed on the same surface of the second dielectric substrate 182. For example, the second dielectric substrate 182 may be another FR4 substrate, another PCB, or another FPC. However, the invention is not limited thereto. In alternative embodiments, the second dielectric substrate 182 is integrated with the first dielectric substrate 181.

Figure 2:
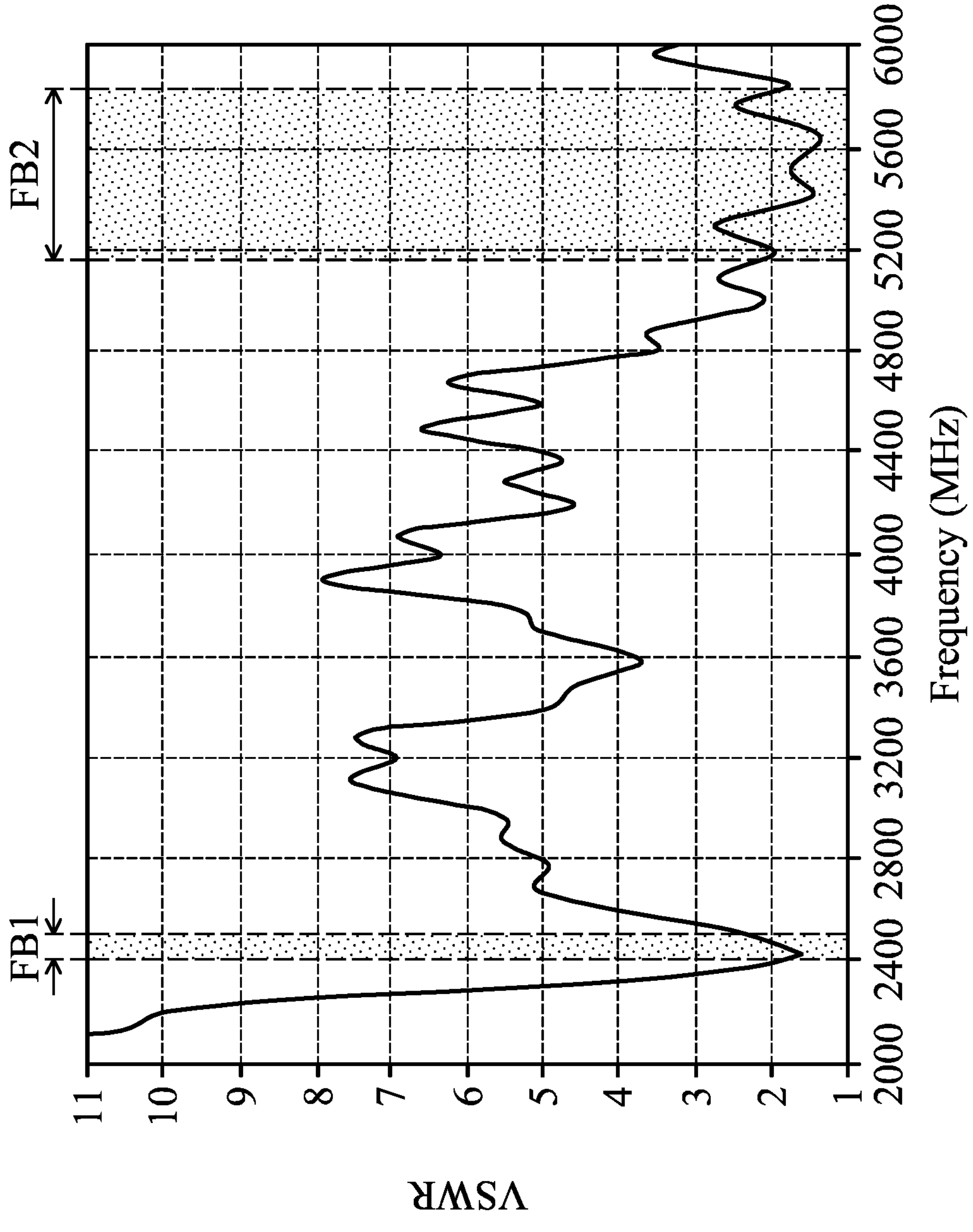
FIG. 2 is a diagram of VSWR (Voltage Standing Wave Ratio) of a first antenna element according to an embodiment of the invention.

FIG. 2 is a diagram of VSWR (Voltage Standing Wave Ratio) of the first antenna element 101 according to an embodiment of the invention. The horizontal axis represents the operational frequency (MHz), and the vertical axis represents the VSWR. According to the measurement of FIG. 2, the first antenna element 101 can cover a first frequency band FB1 and a second frequency band FB2. For example, the first frequency band FB1 may be from 2400 MHz to 2500 MHz, and the second frequency band FB2 may be from 5150 MHz to 5850 MHz.

Figure 3:
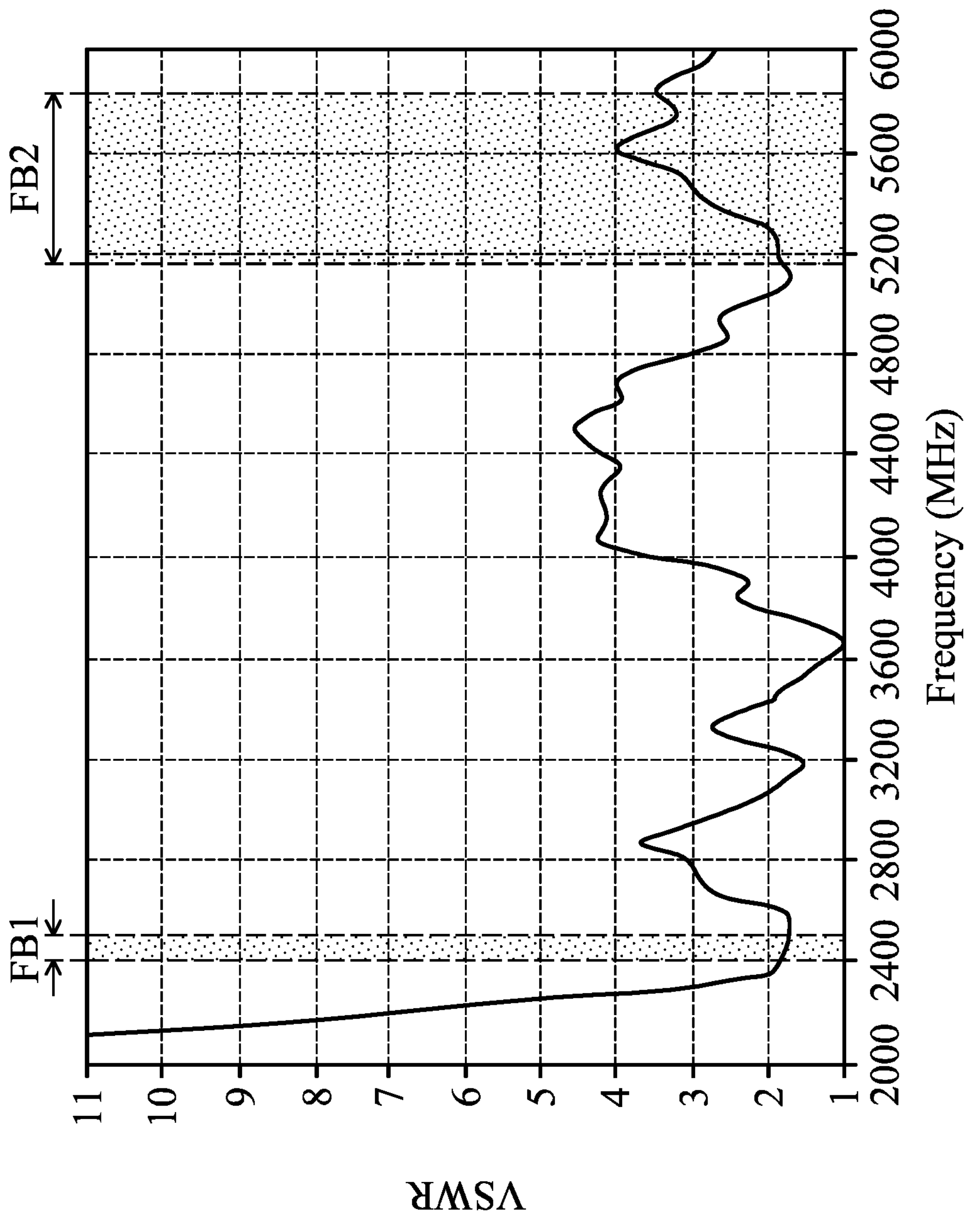
FIG. 3 is a diagram of VSWR of a second antenna element according to an embodiment of the invention.

FIG. 3 is a diagram of VSWR of the second antenna element 102 according to an embodiment of the invention. The horizontal axis represents the operational frequency (MHz), and the vertical axis represents the VSWR. According to the measurement of FIG. 3, the second antenna element 102 can also cover the first frequency band FB1 and the second frequency band FB2 as mentioned above. Therefore, the antenna system 100 can support at least the wideband operations of WLAN (Wireless Local Area Network) 2.4 GHz/5 GHz.

Figure 4:
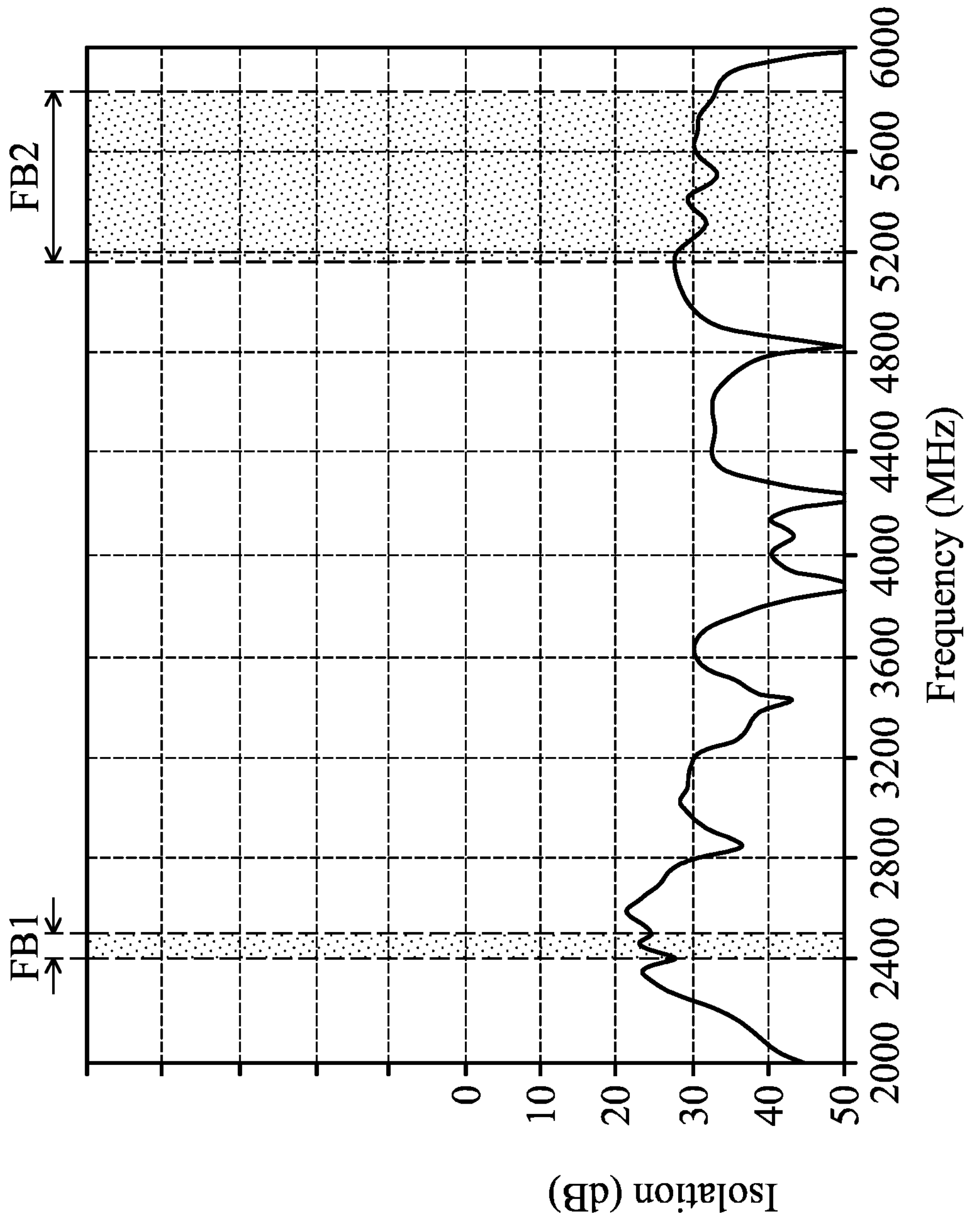
FIG. 4 is a diagram of isolation between a first antenna element and a second antenna element according to an embodiment of the invention.

FIG. 4 is a diagram of the isolation between the first antenna element 101 and the second antenna element 102 according to an embodiment of the invention. The horizontal axis represents the operational frequency (MHz), and the vertical axis represents the isolation (dB). For example, if the first feeding point FP1 is set as a first port (Port 1) and the second feeding point FP2 is set as a second port (Port 2), the absolute value of the S21 parameter between the first port and the second port can be considered as the isolation between the first antenna element 101 and the second antenna element 102. According to the measurement of FIG. 4, the isolation of the antenna system 100 can reach 25 dB or higher within the first frequency band FB1 and the second frequency band FB2 as mentioned above. It can meet the requirements of practical applications of general mobile communication devices.

In some embodiments, the element sizes of the antenna system 100 will be described as follows. The length L1 of the first radiation element 120 may be substantially equal to 0.125 wavelength (λ/8) of the first frequency band FB1 of the antenna system 100. The total length (L2+L3) of the second radiation element 130 and the third radiation element 140 may be substantially equal to 0.25 wavelength (λ/4) of the first frequency band FB1 of the antenna system 100. The length L3 of the third radiation element 140 may be substantially equal to 0.25 wavelength (λ/4) of the second frequency band FB2 of the antenna system 100. The length L4 of the fifth radiation element 160 may be substantially equal to 0.25 wavelength (λ/4) of the second frequency band FB2 of the antenna system 100. The total length (L4+L5) of the fifth radiation element 160 and the sixth radiation element 170 may be substantially equal to 0.25 wavelength (λ/4) of the first frequency band FB1 of the antenna system 100. The width of the first coupling gap GC1 may be shorter than or equal to 2 mm. The width of the second coupling gap GC2 may be shorter than or equal to 1 mm (or 2 mm). The width of the third coupling gap GC3 may be shorter than or equal to 2 mm. Furthermore, in order to enhance the isolation of the antenna system 100, the first distance D1 between the first antenna element 101 and the second antenna element 102 may be longer than or equal to 43 mm, and the second distance D2 between the first feeding point FP1 and the second feeding point FP2 may be longer than or equal to 65 mm. The above ranges of element sizes and parameters are calculated and obtained according to many experiment results, and they help to optimize the isolation, the operational bandwidth, and the impedance matching of the antenna system 100.

Figure 5:
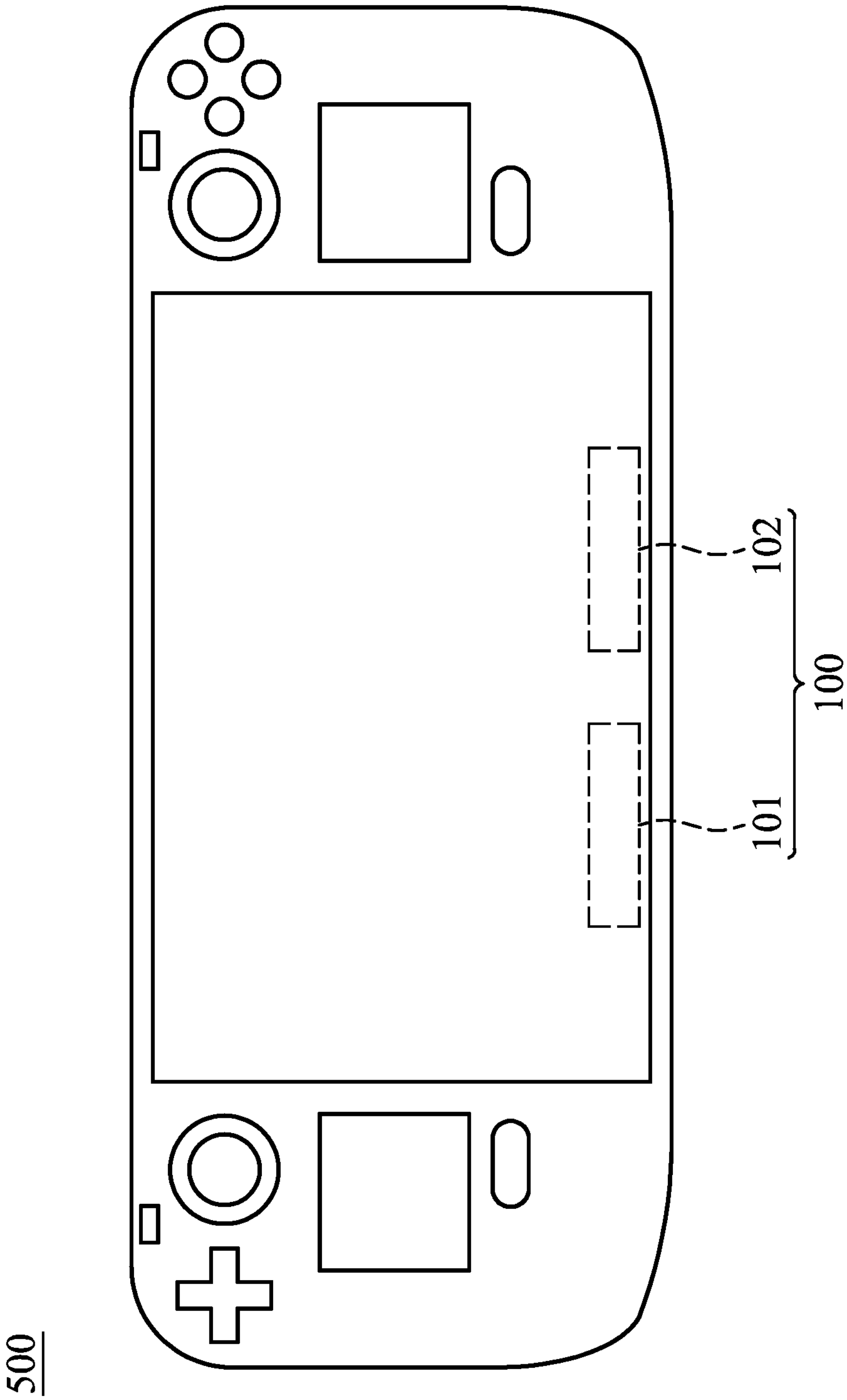
FIG. 5 is a diagram of a handheld game machine according to an embodiment of the invention.

FIG. 5 is a diagram of a handheld game machine 500 according to an embodiment of the invention. In the embodiment of FIG. 5, the handheld game machine 500 includes the aforementioned antenna system 100, and both the first antenna element 101 and the second antenna element 102 are disposed at a middle portion of the handheld game machine 500. Thus, the handheld game machine 500 supports the function of wireless communication. In some embodiments, the handheld game machine 500 further includes an RF circuit, a filter, an amplifier, a processor, and/or a housing, but it is not limited thereto. It should be noted that the antenna system 100 is adjustable according to the style of the handheld game machine 500, without affecting the communication quality thereof. Other features of the handheld game machine 500 of FIG. 5 are similar to those of the antenna system 100 of FIG. 1. Therefore, the two embodiments can achieve similar levels of performance.

The invention proposes a novel antenna system. In comparison to the conventional design, the invention has at least the advantages of high isolation, small size, wide bandwidth, and low manufacturing cost. Therefore, the invention is suitable for application in a variety of mobile communication devices or the IOT.

Note that the above element sizes, element shapes, and frequency ranges are not limitations of the invention. An antenna designer can fine-tune these settings or values according to different requirements. It should be understood that the antenna system of the invention is not limited to the configurations of FIGS. 1-5. The invention may merely include any one or more features of any one or more embodiments of FIGS. 1-5. In other words, not all of the features displayed in the figures should be implemented in the antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:

a first antenna element, comprising:

a first ground element;

a first radiation element, having a first feeding point;

a second radiation element, coupled to the first ground element; and a third radiation element, coupled to the first ground element, wherein the third radiation element is adjacent to the first radiation element and the second radiation element, and wherein the second radiation element substantially has an L-shape, and the third radiation element substantially has an inverted L-shape; and a second antenna element, comprising:

a second ground element;

a fourth radiation element, having a second feeding point;

a fifth radiation element, disposed adjacent to the fourth radiation element; and a sixth radiation element, wherein the fifth radiation element is coupled through the sixth radiation element to the second ground element.

2. The antenna system as claimed in claim 1, wherein a first distance between the first antenna element and the second antenna element is longer than or equal to 43 mm.

3. The antenna system as claimed in claim 1, wherein a second distance between the first feeding point and the second feeding point is longer than or equal to 65 mm.

4. The antenna system as claimed in claim 1, wherein the first radiation element substantially has a straight-line shape.

5. The antenna system as claimed in claim 1, wherein the fourth radiation element substantially has a straight-line shape, and the sixth radiation element substantially has a rectangular shape.

6. The antenna system as claimed in claim 1, wherein a first coupling gap is formed between the third radiation element and the first radiation element, wherein a second coupling gap is formed between the third radiation element and the second radiation element, wherein a third coupling gap is formed between the fifth radiation element and the fourth radiation element, and wherein a width of each of the first coupling gap, the second coupling gap, and the third coupling gap is shorter than or equal to 2 mm.

7. The antenna system as claimed in claim 1, wherein the antenna system covers a first frequency band and a second frequency band, the first frequency band is from 2400 MHz to 2500 MHz, and the second frequency band is from 5150 MHz to 5850 MHz.

8. The antenna system as claimed in claim 7, wherein a total length of the second radiation element and the third radiation element is substantially equal to 0.25 wavelength of the first frequency band.

9. The antenna system as claimed in claim 7, wherein a length of the third radiation element is substantially equal to 0.25 wavelength of the second frequency band.

10. The antenna system as claimed in claim 7, wherein a length of the fifth radiation element is substantially equal to 0.25 wavelength of the second frequency band.

* * * * *